United States Patent [19]
Sayka et al.

[11] Patent Number: 5,743,135
[45] Date of Patent: Apr. 28, 1998

[54] OPTICAL-FIBER LIQUID-LEVEL MONITOR

[75] Inventors: Anthony Sayka; Robert J. Rocks, both of San Antonio, Tex.

[73] Assignee: VLSI Technology, Inc., San Jose, Calif.

[21] Appl. No.: 387,036

[22] Filed: Feb. 10, 1995

Related U.S. Application Data

[63] Continuation of Ser. No. 113,162, Aug. 27, 1993, abandoned.

[51] Int. Cl.⁶ .............................. G01F 23/292; G01F 23/64
[52] U.S. Cl. .............................. 73/293; 73/319; 340/619; 340/624; 250/577; 250/901; 250/904
[58] Field of Search ................ 73/293, 319; 340/619, 340/624; 250/577, 901, 902, 904

[56] References Cited

U.S. PATENT DOCUMENTS

| | | | |
|---|---|---|---|
| 352,647 | 11/1886 | Ghegan | 340/619 |
| 2,655,045 | 10/1953 | Hart | 73/293 X |
| 3,065,354 | 11/1962 | Bird | 73/293 X |
| 3,713,338 | 1/1973 | Kind | 73/293 |
| 3,864,577 | 2/1975 | Pellett et al. | 73/293 |
| 3,947,692 | 3/1976 | Payne | 73/301 X |
| 4,014,010 | 3/1977 | Jinotti | 340/619 |
| 4,247,784 | 1/1981 | Henry | 250/577 |
| 4,256,403 | 3/1981 | Powell | 73/293 X |
| 4,354,180 | 10/1982 | Harding | 340/619 |
| 4,397,183 | 8/1983 | Ballou et al. | 73/293 |
| 4,732,035 | 3/1988 | Lagergren et al. | 73/293 |
| 4,938,590 | 7/1990 | Ishida | 73/293 |
| 5,054,319 | 10/1991 | Fling | 73/319 |
| 5,159,834 | 11/1992 | Eisele | 73/293 |
| 5,194,747 | 3/1993 | Culpepper et al. | 250/577 |
| 5,257,539 | 11/1993 | Gale et al. | 250/577 X |

FOREIGN PATENT DOCUMENTS

| | | | |
|---|---|---|---|
| 0058056 | 8/1982 | European Pat. Off. | 73/293 |
| 0065798 | 12/1982 | European Pat. Off. | 73/293 |
| 1127174 | 12/1956 | France | 340/619 |
| 0080019 | 6/1980 | Japan | 73/293 |
| 0101818 | 8/1980 | Japan | 73/293 |
| 0060219 | 4/1982 | Japan | 73/293 |
| 0074618 | 5/1982 | Japan | 73/293 |
| 0153220 | 9/1982 | Japan | 73/293 |
| 0027021 | 2/1983 | Japan | 73/293 |
| 0114415 | 7/1984 | Japan | 73/293 |
| 0155720 | 9/1984 | Japan | 73/293 |
| 0097586 | 5/1986 | Japan | 73/293 |
| 406074811 | 3/1994 | Japan | 73/293 |
| 1064895 | 4/1967 | United Kingdom | 73/293 |

OTHER PUBLICATIONS

"Canadian–Developed Safety Level Control Uses Fiber Optics Technology," Canadian Controls and Instrumentation, vol. 15, No. 5, p. 7 (May 1976).

*Primary Examiner*—Diego F. F. Gutierrez
*Attorney, Agent, or Firm*—Clifton L. Anderson

[57] ABSTRACT

A liquid level monitor uses a tube to confine a float to a vertical path with a canister containing a lower liquid and an upper liquid which meet at a liquid boundary, the level of which is to be monitored. Light from a light-emitting diode is conveyed to a vertical position of the tube by an optical fiber. A second optical fiber is arranged in a diametrically opposed position of the tube to detect light transmitted across the tube from the first optical fiber. The float is more transmissive than either liquid. When the level of the boundary falls to the level of the optical fibers, received light increases. The second optical fiber conveys this return light to a photodetector, the output of which can be used to trigger an alarm indicating that the boundary level is low.

2 Claims, 4 Drawing Sheets

OPTICAL-FIBER LIQUID-LEVEL MONITOR

This is a continuation application of U.S. patent application Ser. No. 08/113,162, filed Aug. 27, 1993, now abandoned.

BACKGROUND OF THE INVENTION

The present invention relates to control systems and, more particularly, to a system in which the level of a liquid is monitored. A major objective of the present invention is to provide for monitoring a boundary between two liquids as well as between a liquid and a gas.

Much of modern progress has derived from advances in semiconductor processing technology. Semiconductor processing involves depositions, masking, etchings, and other procedures, many of which require a supply of liquid material such as photoresists and chemical etchants. These materials can be stored in canisters, from which they are drawn by automated systems during integrated circuit processing.

Wafers can be ruined if, during a wafer run, one of the key chemical liquids runs out. Accordingly, automatic liquid level indicators are installed in the canisters to trigger an alarm when liquid levels fall too low.

There are several types of liquid level indicators. For example, liquid levels can be indicated by a change in capacitance between two plates as the space between is filled with or depleted of liquid. Others detect liquid level by a reflection off the top surface of the liquid. Stronger signals, and therefore more reliable readings, can be obtained by employing a float and inductively monitoring the level of the float. However, a problem with all these level indicators is that electrical signals are passed in the vicinity of the liquid. This can be hazardous with some materials. In addition, motors and other mechanisms near the canister can introduce noise in the indicator signal, triggering misreadings.

Furthermore, none of the existing indicators serve to indicate the level of a lower liquid when it is covered by a second liquid. In some cases, a liquid can be protected from environmental attack by a covering of another liquid. In other cases, a liquid is covered by a thinner liquid that has separated from a liquid mixture, much as oil and water separate.

What is needed is a method of monitoring the level of a liquid boundary, whether the fluid bounding from above is a liquid or a gas. In addition, it is desirable that the monitor not require electrical components or signals in the vicinity of the liquids being monitored.

SUMMARY OF THE INVENTION

The present invention employs an optically-characterized float with a specific gravity between that of the liquid of interest and that of the fluid bounding the liquid from above. A tube or other guide means is provided to confine the float to motion along a vertically extending path. Light from a light-emitting diode (LED) or other source is guided to the path by an optical fiber. Light returning from the path is monitored. When an appropriate change in the return light occurs, the monitor means signals that the float, and thus the liquid level, has reached a threshold level. This can trigger an alarm and/or other action, such as a refill.

The float can be absorbant (opaque), transmissive (transparent) or reflective of the light from the source. An absorptive float can be used when the two fluids are relatively transparent to the light. A transparent float can be used when the fluids are relatively absorptive. In both the absorptive and the transmissive cases, return light can be guided to a detector by a different optical fiber than the one used to guide light from the source to the path. In the reflective case, a single fiber can be used both for delivery and return. A directional coupler can be used to maximize coupling of source light to the path and of return light to the detector. In a variation of the reflective case, a fluorescent float can be used with appropriate detector filtering to remove source and ambient light.

The detector can be matched to the lower liquid of interest. In such a case, the alarm is sounded not only when the liquid is low, but also when the wrong liquid is present. This can result in considerable savings as the wrong liquid can ruin an entire run of wafers, for example.

More detailed level monitoring can be effected by interrogating the float at each of a series of vertical locations. Optical fibers guide light to and from the vertical locations. The shape and vertical extent of the float can be selected so that it can be detected at two levels at once. Preferably, the float is selected so that the probability of one detection is approximately equal to the probability of two detections to maximize the monitoring resolution.

Where multiple levels are monitored, the rate at which the boundary level, i.e., interface level, changes can be determined by timing level transitions. In such case, a rapidly falling liquid level can be signaled. This provides an additional level of protection for the process in which the liquid is employed.

The present invention provides for liquid level indications, even when the liquid of interest is covered by a second liquid. The present invention can be adapted to cases where both the liquid and the covering fluid are opaque to the light or transparent to the light. The reflective and fluorescent embodiments work with almost any combination of fluids.

Generally, the present invention does not require electrical signals in the vicinity of the liquid. This provides a margin of safety not available with many of the prior art systems. Furthermore, the optical signals that are employed are not degraded by the nearby motors and other electric field generating devices. These and other features and advantages of the present invention are apparent from the description below with reference to the following drawings.

DESCRIPTION OF THE PREFERRED EMBODIMENTS

Figure 1:
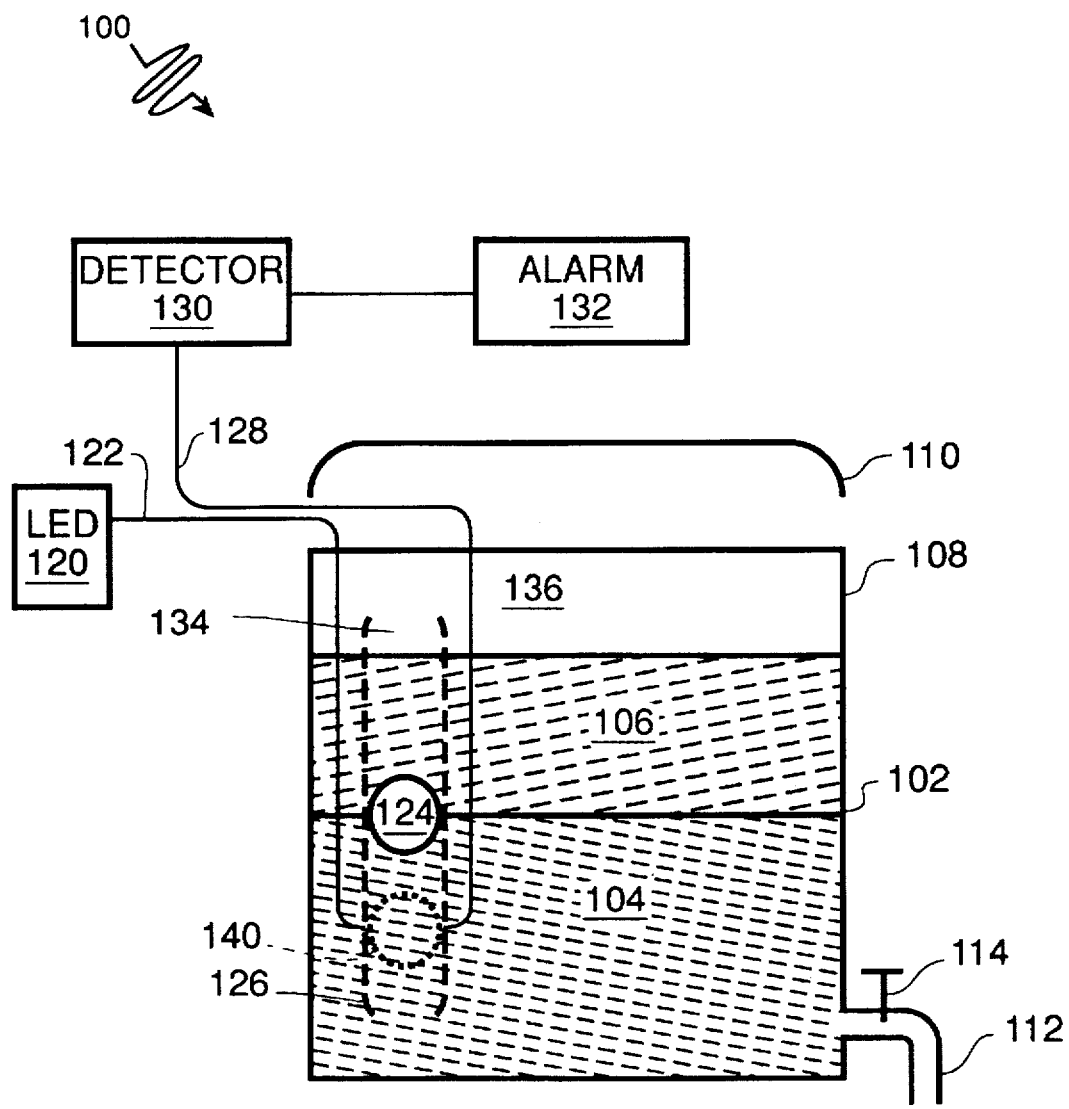
FIG. 1 is a schematic view of a binary liquid-boundary level monitor in accordance with the present invention.

The present invention provides a liquid level monitor 100 for monitoring the level of a liquid boundary 102 between carbon tetrachloride 104 and water 106 contained in a canister 108, as shown in FIG. 1. A dye is dispersed in both liquids. Canister 108 has a top 110 that can be removed to add carbon tetrachloride and water. Canister 108 has a drain 112 through which carbon tetrachloride can be removed, depending on the position of its valve 114.

Monitor 100 includes an LED 120, a delivery optical fiber 122, a float 124, a tube 126, a return optical fiber 128, a photodetector 130, and an alarm 132. Float 124 is a water-filled glass sphere with an average specific gravity of 1.3, which is between water at 1.0 and carbon tetrachloride at 1.6. Accordingly, float 124 tracks the boundary 102 as the volume of carbon tetrachloride is increased or decreased. The diameter of float 124 is nominally 1 centimeter (cm).

Tube 126 is a perforated cylinder with open top and bottom. The perforations and openings provide for ready fluid communication between tube interior 134 and the portion 136 of canister 108 exterior to tube 126. This fluid communication ensures that the boundary level within tube 126 is the same as in canister 108 generally. The inner diameter of tube 126 is 1.2 cm, large enough to permit float 124 free vertical movement, while small enough to confine the movement to the vertical. Tube 126 is tapered at its top and bottom to vertically confine float 124.

LED 120 generates red light that is guided to tube interior 134 via optical fiber 122. Light traversing interior 134 is received by return optical fiber 128 and conveyed to photodetector 130. Return fiber 128 is mounted at a position diametrically opposed to that of delivery optical fiber 122. With float 124 in the illustrated position (at the level of boundary 102), the dye in carbon tetrachloride 104 absorbs most of the light, so photodetector 130 sends a negative indication to alarm 132.

When a process requires carbon tetrachloride, valve 114 is opened and carbon tetrachloride 104 exits through drain 112. In this event, boundary 102 falls, and float 124 drops accordingly. When float 124 reaches the level shown in phantom at 140, it displaces the dye-containing carbon tetrachloride with clear glass and water. With float 124 at this level, sufficient light reaches return optical fiber 128 that photodetector 130 triggers alarm 132.

Photodetector 130 is thresholded to match the light expected when the carbon tetrachloride is above level 140. Therefore, if cannister 108 is filled with the wrong liquid, alarm 132 will be triggered before any of the wrong liquid is drained.

Figure 2:
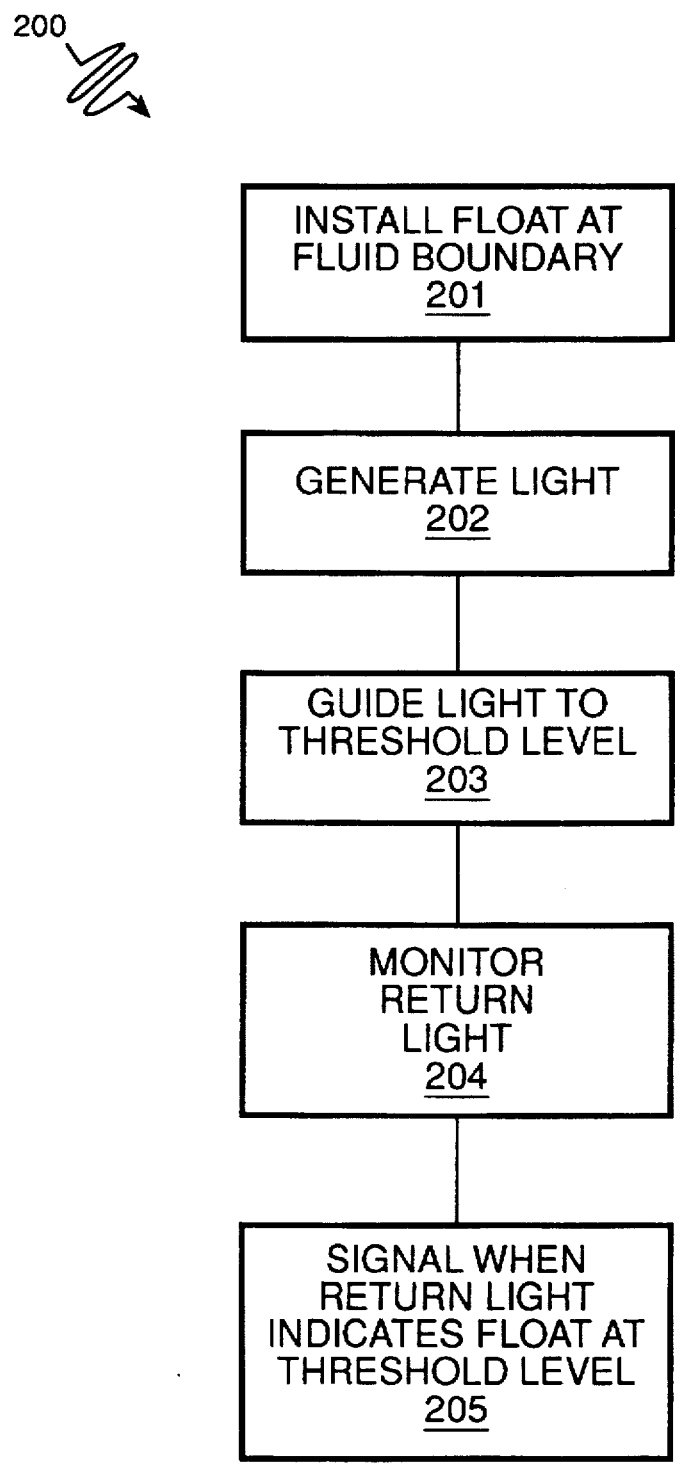
FIG. 2 is a flow chart of a method employing the monitor of FIG. 1 in accordance with the present invention.

A method 200 employed by monitoring system 100 is flow charted in FIG. 2. Float 124 is installed at boundary 102 at step 201. Light is generated by LED 120 at step 202. The light is guided to tube interior 134 at step 203. Detector 130 monitors light returning along fiber 128 at step 204. When the signal reaching photodetector 130 indicates that float 124 is at the threshold level of fibers 122 and 128, photodetector 130 triggers alarm 132 at step 205.

Monitor 100 readily accommodates other fluid combinations. With a water and carbon tetrachloride combination, without dye, an opaque float can be used. In this configuration, detected light is a negative indication; an alarm is issued in response to the absence of light that occurs when the opaque float occludes the light. It should be noted that when two liquids are involved, a sphere filled with the lighter of the two liquids or a combination of the two fluids will generally have the desired specific gravity. If an opaque float is required, the shell of the float can be selected to be opaque. If a transparent float is required, glass, water, and air can be combined if the fluids at the boundary are not sufficiently transparent.

When the cover fluid is a gas, e.g., ambient air, an opaque float can be used provided the liquid is transmissive. If the liquid is nearly opaque to the light, an absorptive gas can be used, or a second opaque liquid can be used to provide contrast for a transparent float. In general, source light frequency can be selected so that the fluids are either both transmissive or both opaque, so there is more latitude in selecting a contrasting float.

Figure 3:
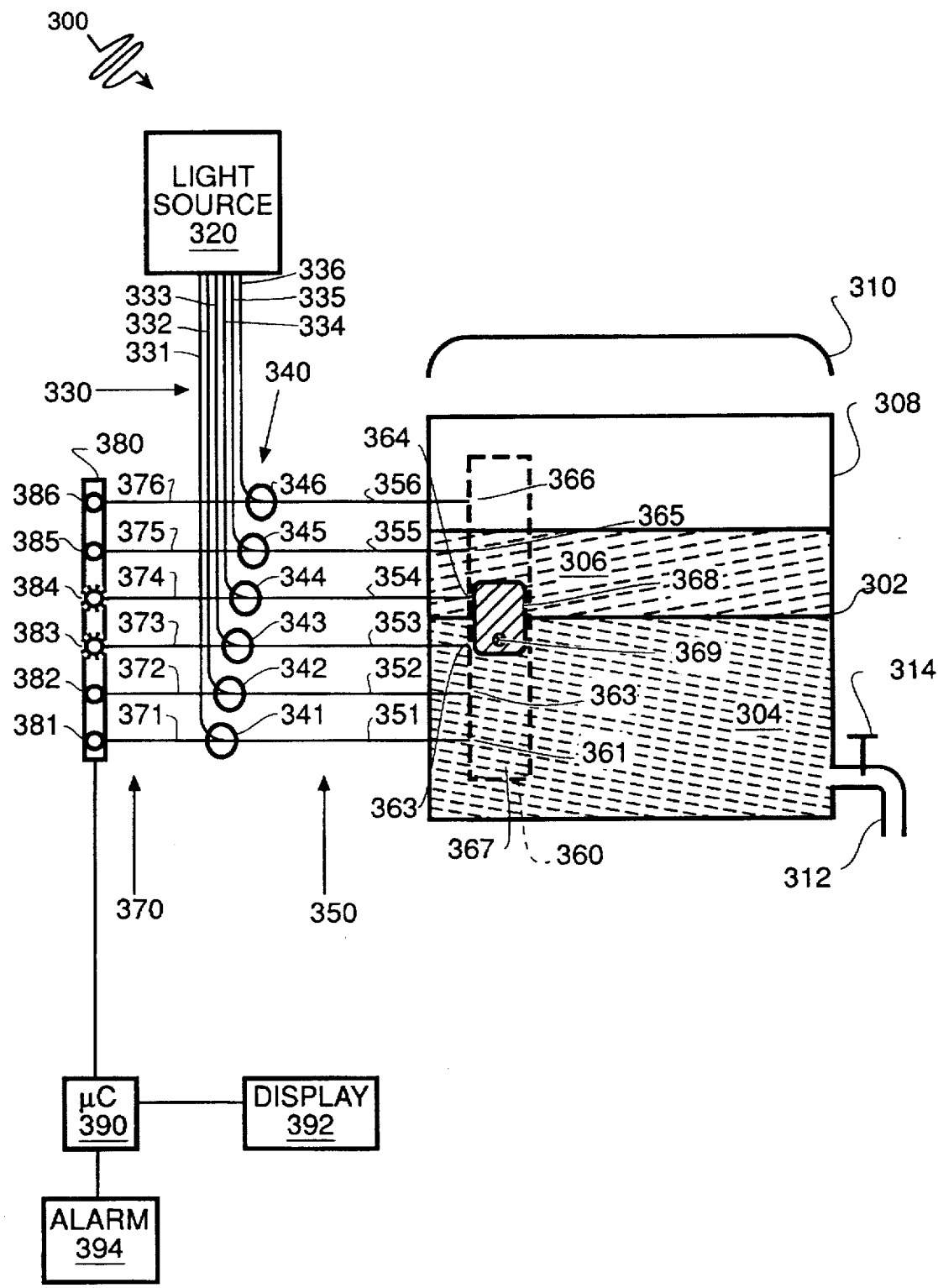
FIG. 3 is a schematic of a multi-level liquid-boundary level monitor in accordance with the present invention.

A multi-level liquid-boundary monitor 300, shown in FIG. 3, monitors a liquid boundary 302 between carbon tetrachloride 304 and water 306 in a canister 308. Canister 308 has a top 310, a drain 312, and a drain valve 314. Monitor 300 comprises a light source 320, an optical delivery bus 330, an optical coupler bank 340, an optical local bus 350, a tube 360, a float 368, an optical return bus 370, a detector array 380, a microprocessor 390, a display 392 and an alarm 394.

Light source 320 is a bank of six LEDs, each coupled to a respective delivery optical fiber 331, 332, 333, 334, 335, 336 of delivery bus 330. The delivery optical fibers convey light generated by the LEDs to directional couplers 341, 342, 343, 344, 345 and 346 of coupler bank 340. These directional couplers efficiently couple light from the delivery fibers into local fibers 351, 352, 353, 354, 355 and 356 of local bus 350. The local fibers convey light to an interior 367 of tube 360 at respective vertical positions 361, 362, 363, 364, 365 and 366, having a pitch of 2 cm.

Tube 360 confines float 368 to the substantially vertical path defined by tube interior 367. Tube 360 is sufficiently apertured that the level of boundary 302 is the same within and without tube 360. Tube 360 has an internal diameter of 1.1 cm and a height of 14 cm. Tube 360 has a perforated top and a perforated bottom that vertically confine float 368.

Float 368 is a water-filled stainless-steel cylinder. The stainless steel is distributed so that the center of gravity 369 is vertically off center. This provides stability to the vertical orientation of float 368. Float 368 is 1.0 cm in diameter and 3.0 cm in height. The height of float 368 is selected so that, in any position, extends past at least one and at most two of vertical positions 361, 362, 363, 364, 365, and 366. More precisely, the float height is chosen so that, for random boundary level, the likelihood of float 368 extending past a single vertical position is nominally the same as the likelihood of float 368 extending past two vertical positions. This height maximizes vertical tracking resolution. In alternative embodiments, the float can extend over a greater number of vertical positions. Generally, the likelihood of extending past an odd number of vertical positions can be between 30% and 70%.

Stainless steel float 368 is more reflective than carbon tetrachloride 304 and than water 306. Therefore, with boundary 302 at the level shown in FIG. 3, more light is reflected back into local fibers 353 and 354 than into the other local fibers fibers. Couplers 341–346 efficiently couple returning light into return fibers 371–376. The thresholds of photodetectors 381–386 are set to distinguish between the intensity of light reflected from float 368 and the intensity of light received where float 368 is not present. With float 368 at the level shown in FIG. 3, photodetectors 383 and 384 are activated, while the other photodetectors remain off. (Each photodetector can drive a respective LED to enhance ergonomics; this arrangement is contemplated by FIG. 3).

The readout of detector array 380 is transferred to microprocessor 390. Microprocessor 390 distinguishes among eleven vertical positions. From down to up, these positions are recognized as follows, with the numbers in each pair of parentheses indicating the detectors that are activated: (361); (361, 362); (362); (362; 363); (363); (363, 364); (364); (364, 365); (365); (365, 366); and (366). Microprocessor 390 records the transition times between the levels and calculates level change rates based on the recorded transition times.

These rates can be used to calculate estimated times until refill. These estimated times can be displayed on display 392.

Alarm 394 is activated in two cases: "low level" and "short-time-to empty". When the level is (361, 362) or (361), the alarm indicates that a refill is required. When the level is higher, but the level is falling realtively fast, microprocessor 390 can activate alarm 394. This serves as a protection when greater than normal use of a liquid is employed or when there is a leak.

Figure 4:
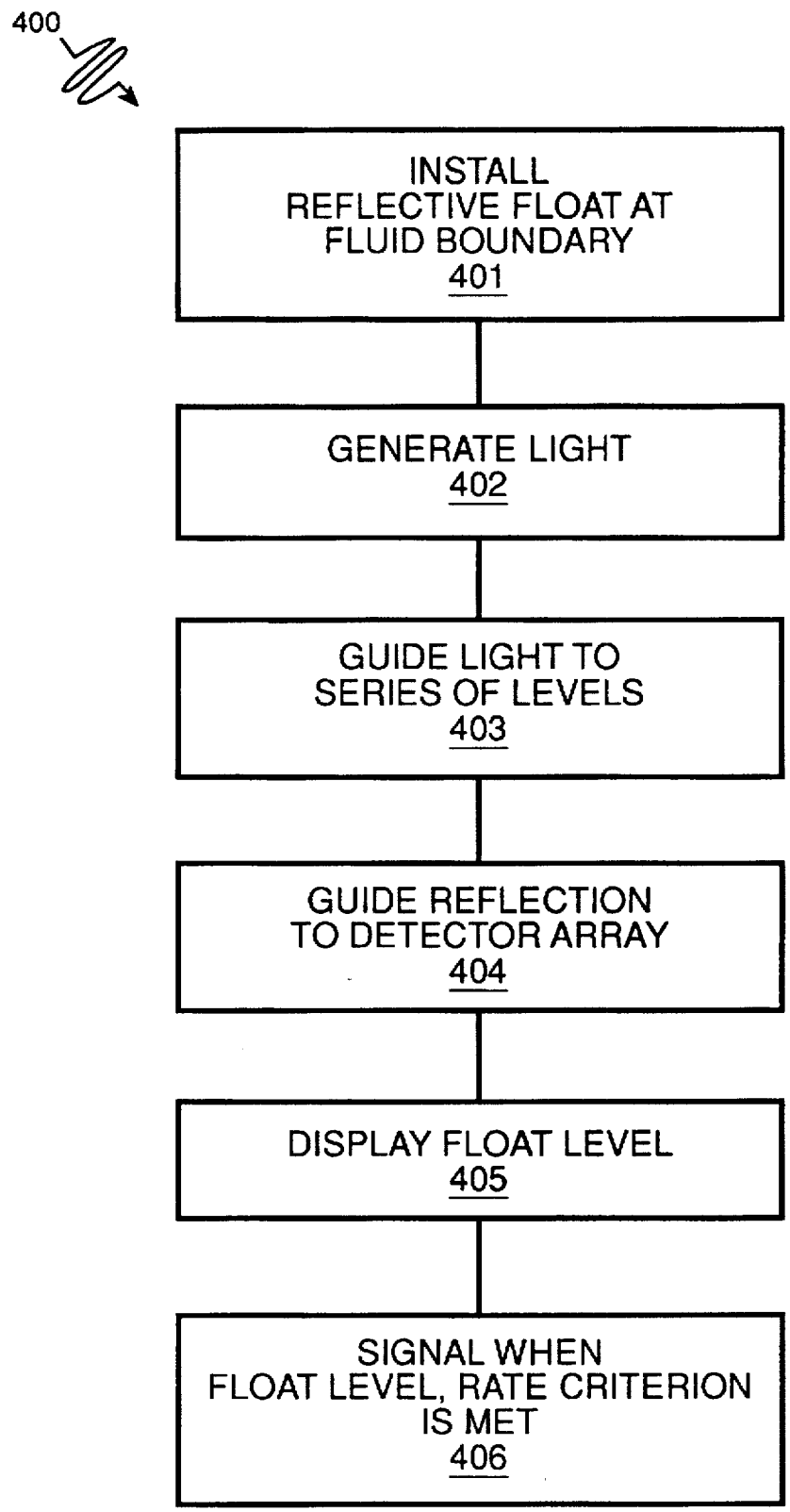
FIG. 4 is a flow chart of a method employing the monitor of FIG. 3 in accordance with the present invention.

A method 400 employed in conjunction with monitor 300 is flow charted in FIG. 4. Reflective float 368 is installed at fluid boundary 302 at step 401. Light source 320 generates light at step 402. Delivery bus 330, coupler bank 340 and local bus 350 guide this light to vertical positions 361–366 of tube 360 at step 403. Reflections are guided to detector array 380 via local bus 350, coupler bank 340 and return bus 370 at step 404. The float level is displayed on display 392 and on dedicated LEDs of array 380 at step 405. When the indicated level is undesirably low, or when the level is dropping at an unacceptable rate given the level, a signal is sent to trigger alarm 394 at step 406.

In an alternative to system 300, the faces of the tube and the float facing the local fibers are flattened. This limits rotation of the float and enhances the strength of the reflections back to the local fibers. The altered float surface can be made slightly concave to further enhance reception of the reflections.

System 300 can also incorporate a float with a fluorescent coating. The coating can induce a frequency shift in the reflected light relative to the source light. Light reflected by the fluids and tube surfaces does not undergo this frequency shift. Light reaching the detector array can be frequency filtered so that the sensitivity the photodetectors for the fluorescence frequency is enhanced relative to the sensitivity of the source light. This use of fluorescence can enhance float tracking where stray reflections are a problem.

The present invention can be applied to a wide range of liquids, including most of those used for semiconductor processing. For example, the lower liquid can be tetramethyl ammonium hydroxide (TMAH), usually 2–3% in water. For another example, edge bead remover (EBR), various formulations of which are known to those skilled in the art, can be the lower liquid. Obviously, the tube and float must be compatible with the fluids they contact; for example, if the liquid is hydrofluoric acid, the float should be stainless steel or plastic rather than glass. These and other modifications to and variations upon the preferred embodiments are provided for by the present invention, the scope of which is limited only by the following claims.

We claim:

1. A liquid-level monitor for monitoring the level of a boundary between a liquid and another fluid within a vessel, said liquid having a first specific gravity, said fluid having a second specific gravity less than said first specific gravity, said monitor comprising:

a light source for providing source light;

photodetector means for providing a characterization of return light, said characterization including whether or not said return light meets a predetermined intensity criterion, said photodetector means responding more sensitively to the return light frequency than to the source light frequency;

optical fiber means for guiding said source light to a location set within said vessel and guiding said return light from said location set to said photodetector means, said set including at least one location, each location of said set corresponding to a respective level of said boundary within said vessel, said optical fiber means including at least one length of optical fiber through which said source light travels in one direction and said return light travels in an opposing direction;

a float disposed at said boundary, said float having a third specific gravity between said first specific gravity and said second specific gravity, said float converting said source light into said return light meeting said intensity criterion, said float being fluorescent so that the frequency of said return light is different from the frequency of said source light; and guide means for confining movement of said float to a vertically extending path.

2. A liquid-level monitor for monitoring the level of a boundary between a liquid and another fluid within a vessel, said liquid having a first specific gravity, said fluid having a second specific gravity less than said first specific gravity, said monitor comprising:

a light source for providing source light;

photodetector means for providing a characterization of return light, said characterization including whether or not said return light meets a predetermined intensity criterion;

optical fiber means for guiding said source light to a location set within said vessel and guiding said return light from said location set to said photodetector means, said set including plural locations, each location of said set corresponding to a respective level of said boundary within said vessel, said optical fiber means including at least one length of optical fiber through which said source light travels in one direction and said return light travels in an opposing direction;

a float disposed at said boundary, said float having a third specific gravity between said first specific gravity and said second specific gravity, said float converting said source light into said return light meeting said intensity criterion;

guide means for confining movement of said float to a vertically extending path; and boundary motion determination means being coupled to said photodetector means for detecting when said boundary crosses each of said levels, said boundary motion determination means including timing means so that the time interval between level indications can be determined, said boundary motion determination means including calculation means for calculating the rate at which said boundary is moving from said time interval.

* * * * *